United States Patent
Wang

(10) Patent No.: US 11,027,666 B2
(45) Date of Patent: Jun. 8, 2021

(54) VEHICLE MEDIA PLAYER

(71) Applicant: Shenzhen Jiemeisi Industrial Co., Ltd., Shenzhen (CN)

(72) Inventor: Liming Wang, Shenzhen (CN)

(73) Assignee: SHENZHEN JIEMEISI INDUSTRIAL CO., LTD., Shenzhen (CN)

( * ) Notice: Subject to any disclaimer, the term of this patent is extended or adjusted under 35 U.S.C. 154(b) by 1 day.

(21) Appl. No.: 16/813,729

(22) Filed: Mar. 9, 2020

(65) Prior Publication Data
US 2021/0107412 A1 Apr. 15, 2021

(30) Foreign Application Priority Data
Oct. 12, 2019 (CN) .......................... 201921714122.1

(51) Int. Cl.
*B60R 11/02* (2006.01)
*H04M 1/60* (2006.01)
*B60R 11/00* (2006.01)

(52) U.S. Cl.
CPC ...... *B60R 11/0247* (2013.01); *B60R 11/0205* (2013.01); *B60R 2011/0054* (2013.01); *H04M 1/6075* (2013.01); *H04R 2499/13* (2013.01)

(58) Field of Classification Search
CPC ............. B60R 11/0247; B60R 11/0205; B60R 2011/0054; H04M 1/6075; H04R 2499/13
USPC ............................................. 455/569.2, 41.2
See application file for complete search history.

(56) References Cited

U.S. PATENT DOCUMENTS

| | | | | |
|---|---|---|---|---|
| 6,114,774 | A * | 9/2000 | Fiegura .................. | G10H 1/361 307/9.1 |
| 7,930,004 | B2 * | 4/2011 | Seil ......................... | H04B 1/38 455/575.1 |
| 8,923,527 | B2 * | 12/2014 | Buchheim ........... | H04M 1/6075 381/86 |
| 2007/0015537 | A1 * | 1/2007 | DeBiasio ............ | H04M 1/6091 455/556.1 |
| 2008/0013758 | A1 * | 1/2008 | Tsai ....................... | H04R 1/406 381/122 |
| 2008/0032650 | A1 * | 2/2008 | Zhang .................. | H04M 1/6091 455/185.1 |
| 2008/0312935 | A1 * | 12/2008 | Mau, II ................ | G11B 27/105 704/275 |
| 2010/0273421 | A1 * | 10/2010 | Tu ............................ | H04B 1/38 455/41.2 |

* cited by examiner

*Primary Examiner* — Ankur Jain

(57) ABSTRACT

A vehicle media player includes a media player module, a microphone module electrically connected to the media player module, a cigarette lighter connector; and a connection cable having two opposite ends that are electrically connected to the media player module and the cigarette lighter connector, respectively. The microphone module includes a first casing, a second casing, a unidirectional microphone, a protective housing, and a microphone support. The unidirectional microphone is fixed to the microphone support, and one end of each of the first casing and the second casing is received in one end of the protective housing.

9 Claims, 6 Drawing Sheets

VEHICLE MEDIA PLAYER

CROSS REFERENCE TO RELATED APPLICATIONS

This application claims priority to Chinese Patent Application No. 201921714122.1, filed Oct. 12, 2019, which is hereby incorporated by reference herein as if set forth in its entirety.

BACKGROUND

1. Technical Field

The present disclosure generally relates to vehicle media players, and particularly to a vehicle media player having a unidirectional microphone.

2. Description of Related Art

Vehicle media players are known. Many vehicle media players can be connected to mobile devices (e.g., cell phones), and then serve as audio output devices. Although conventional vehicle media players can meet basic requirements, it is always useful and desirable to provide a new vehicle media player.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
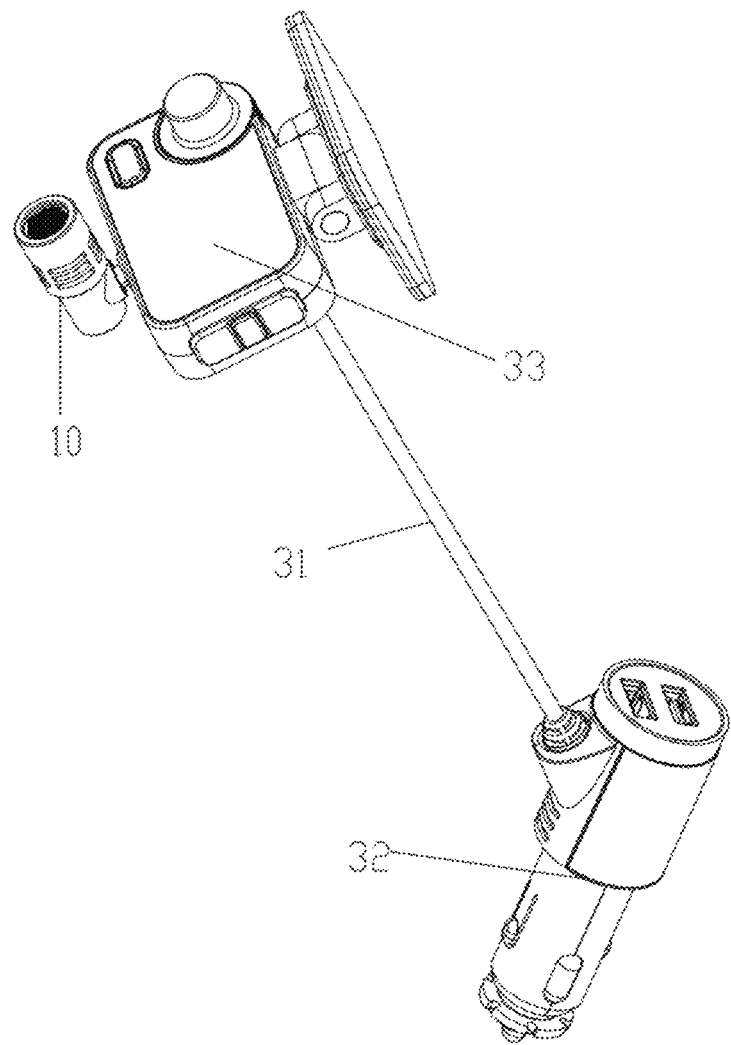
FIG. 1 is an isometric view of a vehicle media player according to an embodiment.
Figure 2:
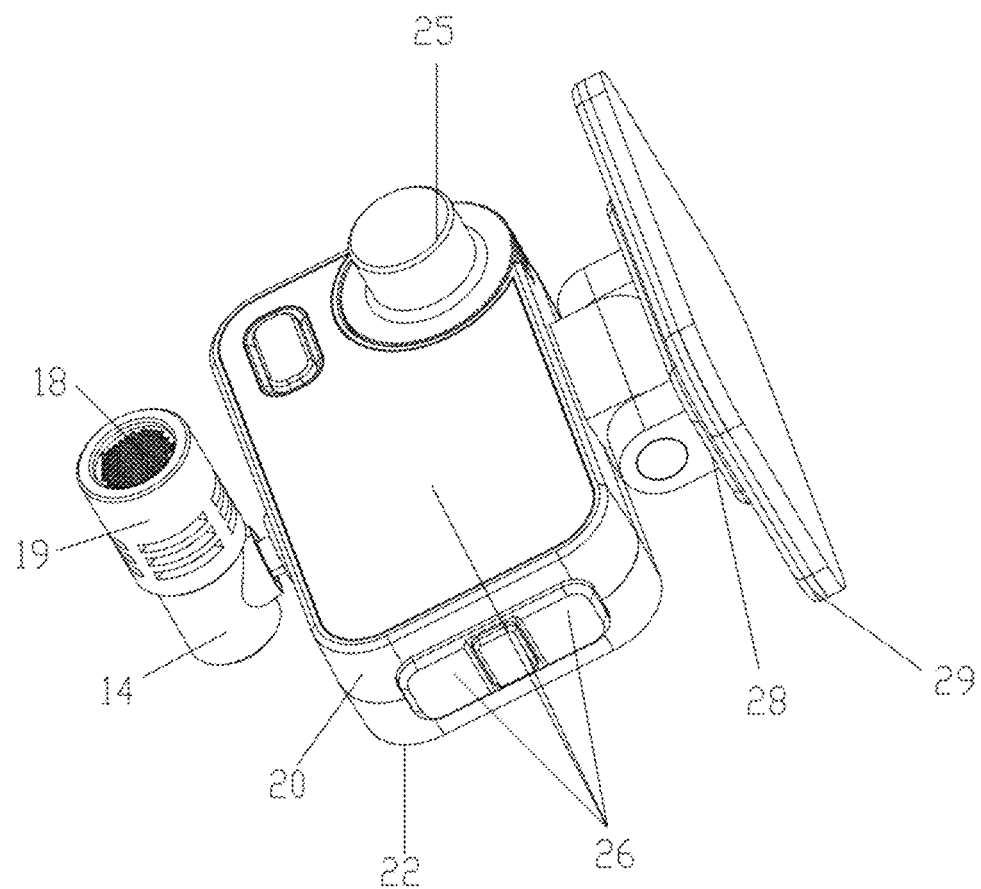
FIG. 2 is similar to FIG. 1, with a cable and a cigarette lighter connector omitted for clarity.
Figure 3:
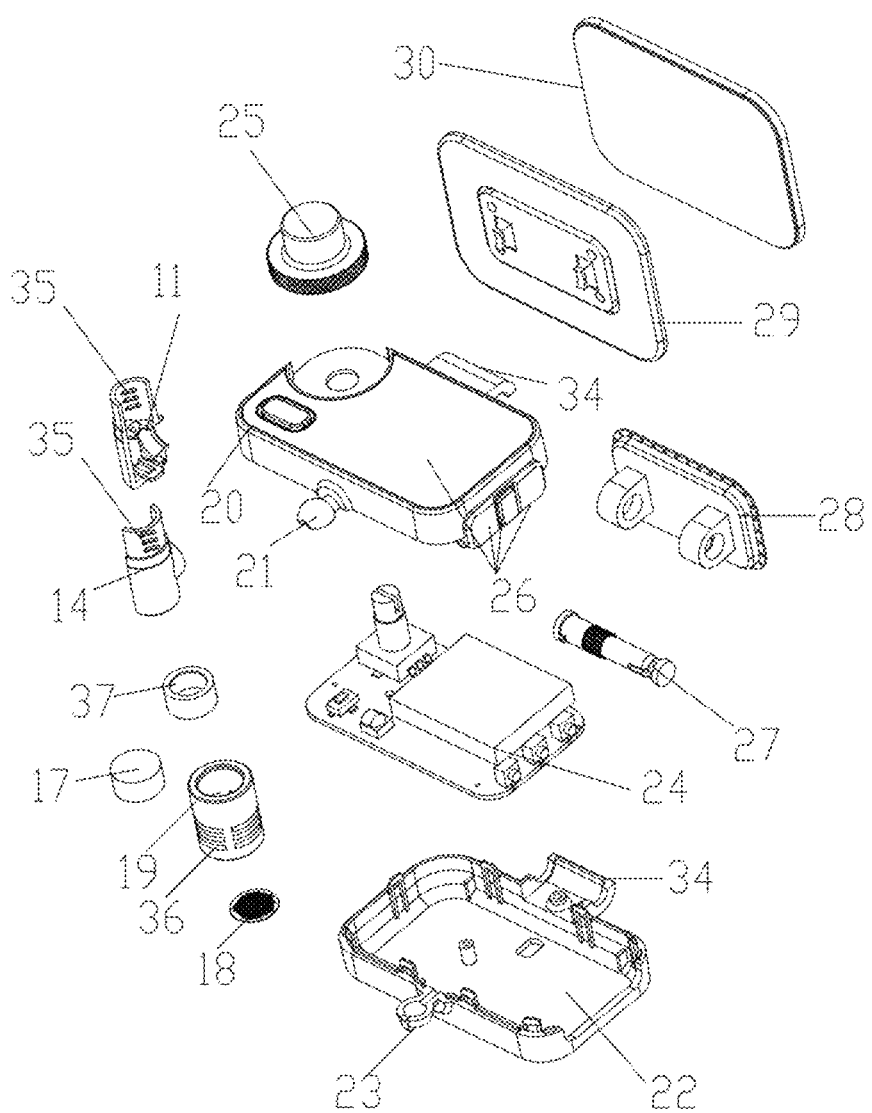
FIG. 3 is an isometric exploded view of the assembly of FIG. 2.
Figure 4:
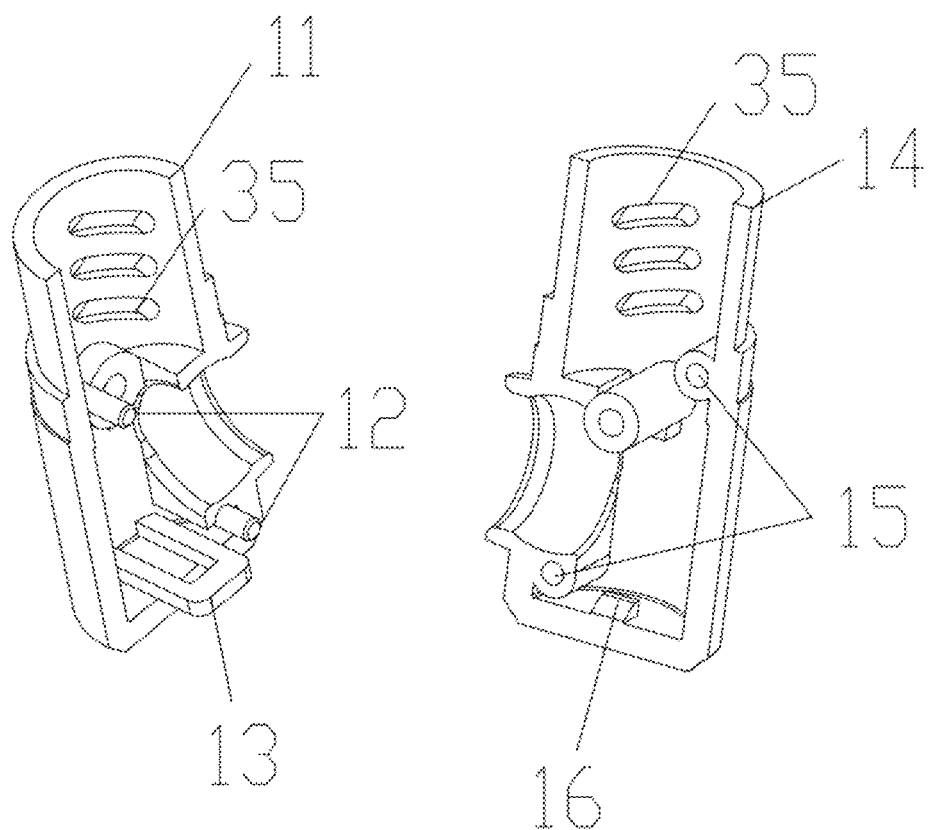
FIG. 4 shows an isometric view of a first casing and a second casing that are separated from each other.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Referring to FIGS. 1-4, in one embodiment, a vehicle media player includes a media player module 33, a microphone module 10 electrically connected to the media player module 33, a cigarette lighter connector 32, and a connection cable 31 having two opposite ends that are respectively, electrically connected to the media player module 33 and the cigarette lighter connector 32. The media player module 33 includes a cover 20 and a base 22 fixed to the cover 20. The cover 20 includes a first half universal joint 21 on a side surface thereof, and the base 22 includes a second half universal joint 23 on a side surface thereof. The first half universal joint 21 and the second half universal joint 23 corporately form a complete universal joint. The microphone module 10 includes a first casing 11 and a second casing 14. The first casing 11 and the second casing 14, which are connected to each other as a whole, are connected to the universal joint, which allow the microphone module 10 to rotate with respect to the media player module 33.

In the embodiment, when the cover 20 and the base 22 are fixed to each other, the first half universal joint 21 and the second half universal joint 23 corporately form a complete universal joint. The universal joint is hollow and defines a hollow passage that allows the cable connecting the microphone module 10 to the media player module 33 to pass therethrough. The first casing 11 and the second casing 14 form a hollow cylinder that receives therein the universal joint in a way that the microphone module 10 can rotate freely with respect to the media player module 33. As a result, the microphone module 10 can be rotated to a proper orientation so as to point to or be close to a user or a sound source, which facilitates a better sound pickup. The media player module 33 further includes a Bluetooth module, an FM module and a number of charging ports. The Bluetooth module can be wirelessly connected to other Bluetooth modules, such as the Bluetooth module of a cell phone or a car. When the vehicle media player is connected to a power source, it can charge other devices through the charging ports.

In one embodiment, the microphone module 10 further includes a unidirectional microphone 17 and a protective housing 19. The unidirectional microphone 17 is arranged within the microphone module 10. One end of each of the first casing 11 and the second casing 14 is received in one end of the protective housing 19. The first casing 11 and the second casing 14 each define a number of first through holes 35, and the protective housing 19 defines a number of second through holes 16 communicating with the first through holes 35 of the first casing 11 and the second casing 14. The microphone module 10 further includes a microphone support 37, to which the unidirectional microphone 17 is fixed. The unidirectional microphone 17 and the microphone support 37 are arranged within the microphone module 10.

In the embodiment, with almost half of each of the first casing 11 and the second casing 14 received in the protective housing 19, the protective housing 19 can protect the unidirectional microphone 17. The microphone module 10 further includes a mesh 18 arranged on the top of the protective housing 19. The microphone support 37 can absorb shock, and the sound inlet holes of the unidirectional microphone 17 are set to be as large as possible. The sound inlet holes are close to the surface of the casing, so that the microphone can conveniently pick up the sound. The arrangement of the first through hole 35 and the second through hole 36 increases the sound pickup effect and ensures the balance of the microphone sensitivity. The cavity of the unidirectional microphone 17 and the housings of the media player must be sealed and isolated, or the pickup portion of the unidirectional microphone 17 is independent from the media player, so as to prevent the noise signal generated by the internal parts of the machine from interfering with the pickup of the unidirectional microphone 17, which generates a noise. The total area of sound inlet holes is not less than 30% of the cross-sectional area of the cavity of the unidirectional microphone 17, and the larger the better, so as to ensure the airflow balance of the unidirectional microphone 17. The front and rear first through holes 35 and the second through holes 36 are as close as possible to the front and rear pickup holes of the unidirectional microphone 17, so as to reduce the resistance of air flow, thereby achieving optimal sound pickup effect.

In one embodiment, the microphone support 37 is made of soft silicone gel, which protects the unidirectional microphone 17 from being damaged by a hard object. Furthermore, the microphone support 37 is able to filter out the slight vibration of the housing and prevent it from being transmitted to the unidirectional microphone 17, which reduces noise pickup by the unidirectional microphone 17. The microphone support 37 may be constructed in various forms. According to the actual needs, the best vibration reduction and vibration filtering effects can be achieved by adjusting the thickness, hardness, length of the fixed arm, and suspended state.

In one embodiment, the first casing 11 includes a first engagement member 13, and the second casing 14 includes a second engagement member 16. The first engagement member 13 and the second engagement member 16 are connected to each other in a snap-fit manner so as to fix the first casing 11 to the second casing 14. In the embodiment, the first engagement member 13 is a tab with a rectangular slot and the second engagement member 16 is a block that can be fit in the rectangular slot. The first casing 11 includes two positioning posts 12 protruding from the inner surface thereof at different positions, and the second casing 14 correspondingly defines two positioning holes to respectively receive the positioning posts 12 so as to position the first casing 11 with respect to the second casing 14. In the embodiment, the first casing 11 and the second casing 14 each defines a threaded hole, which allows a screw to be screwed thereinto so as to fix the first casing 11 to the second casing 14.

In one embodiment, the media player module 33 further includes a circuit board 24, a rotary knob 25, and a button 26. The circuit board 33 is received in a chamber defined by the cover 20 and the base 22. The rotary knob 25 and the button 26 are connected to the cover 20. The rotary knob 25 can be manually rotated so as to move or actuate a component on the circuit board 33, which can be used to adjust the volume of the sound output. The button 26 can be manually depressed or slid so as to move or actuate a component on the circuit board 33, which can be used to turn on/off the vehicle media player.

In one embodiment, the cover 20 and the base 22 each include a connection member 34. The media player module 33 further includes a shaft 27 and shaft support 28. The connection members 34 corporately define a receiving space, the shaft 27 is fixed to the shaft support 28 and rotatably fit in the receiving space, which rotatably connects the shaft support 28 to the cover 20 and the base 22.

In the embodiment, each connection member 34 defines a hollow space. The hollow space of the connection members 34 corporately form a round through hole. The shaft 27 is rotatably fit in the round through hole, which rotatably connects the shaft support 28 to the cover 20 and the base 22.

In one embodiment, the media player module 33 further includes an attachment member 29, and the shaft support 28 is fixed to the attachment member 29. The media player module 33 further includes a rubber pad 30 fixed to the attachment member 29. In the embodiment, the rubber pad 30 is fixed to a side of the attachment member 29 opposite the side where the shaft support 28 is fixed.

Figure 5:
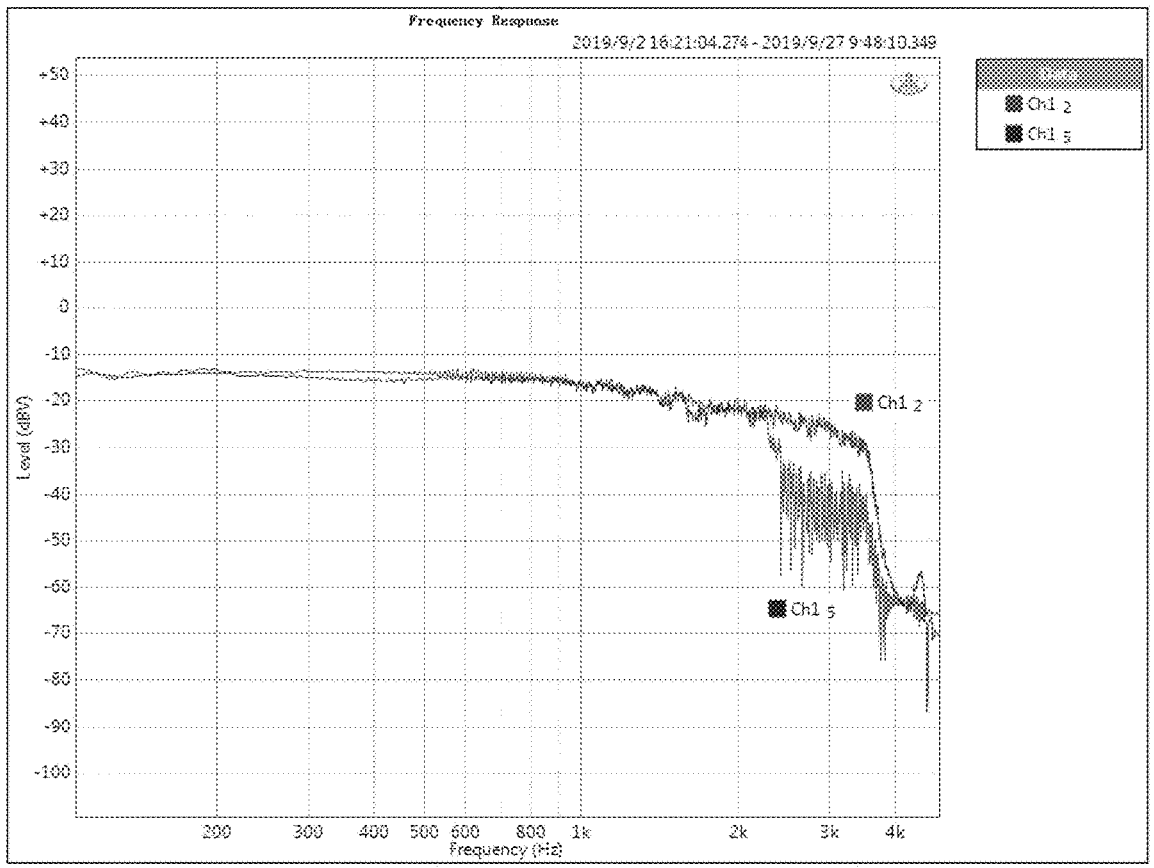
FIG. 5 shows a comparison of the frequency response curves of the vehicle media player of the present disclosure and a conventional vehicle media player.
Figure 6:
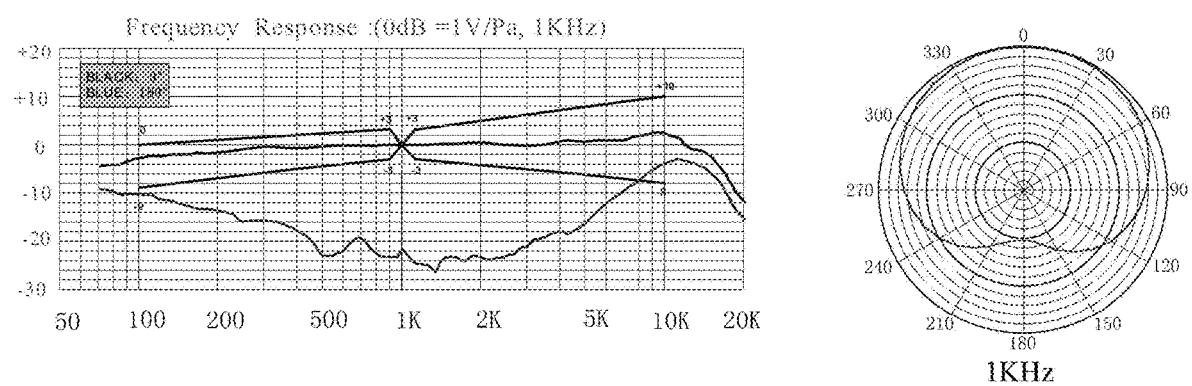
FIG. 6 is a characteristic diagram of the unidirectional microphone of the present disclosure.

FIG. 5 shows a comparison of the frequency response curves, in which the $ch1_2$ curve represents the frequency response curve of the vehicle media player of the present disclosure, which includes a unidirectional microphone, and the $ch1_5$ curve represents the frequency response curve of a conventional vehicle media player including an omni-directional microphone. It can be seen from FIG. 5 that the vehicle media player of the present disclosure using a unidirectional microphone picks up less noise. FIG. 6 is a characteristic diagram of the unidirectional microphone of the present disclosure. It can be seen from FIG. 6 that the unidirectional microphone has only a pickup range of 180 degrees, and cannot pick up sound outside the pickup range.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A vehicle media player comprising:
    a media player module;
    a microphone module electrically connected to the media player module, the microphone module comprising a first casing, a second casing, a unidirectional microphone, a protective housing, and a microphone support, the unidirectional microphone is fixed to the microphone support, and one end of each of the first casing and the second casing being received in one end of the protective housing;
    a cigarette lighter connector; and
    a connection cable comprising two opposite ends that are electrically connected to the media player module and the cigarette lighter connector, respectively;
    wherein the first casing and the second casing each define a plurality of first through holes, and the protective housing defines a plurality of second through holes communicating with the first through holes of the first casing and the second casing.

2. The vehicle media player according to claim 1, wherein the media player module comprises a cover and a base fixed to the cover.

3. The vehicle media player according to claim 2, wherein the cover comprises a first half universal joint, and the base comprises a second half universal joint, the first half universal joint and the second half universal joint form a universal joint, the first casing and the second casing, which are connected to each other as a whole, are connected to the universal joint, which allow the microphone module to rotate with respect to the media player module.

4. The vehicle media player according to claim 3, wherein the first casing comprises a first engagement member, and the second casing comprises a second engagement member, the first engagement member and the second engagement member are connected to each other in a snap-fit manner so as to fix the first casing to the second casing.

5. The vehicle media player according to claim 3, wherein the first casing includes a positioning post, and the second casing defines a positioning hole to receive the positioning post so as to position the first casing with respect to the second casing.

6. The vehicle media player according to claim 2, wherein the media player module further comprises a circuit board, a rotary knob, and a button, the circuit board is received in a chamber defined by the cover and the base, and the rotary knob and the button are connected to the cover.

7. The vehicle media player according to claim 2, wherein the cover comprises a first connection member, the base comprises a second connection member, the media player module further comprises a shaft and shaft support, the first connection member and the second connection member corporately define a receiving space, the shaft is fixed to the shaft support and rotatably received in the receiving space, which rotatably connects the shaft support to the cover and the base.

8. The vehicle media player according to claim 7, wherein the media player module further comprises an attachment member, and the shaft support is fixed to the attachment member.

9. The vehicle media player according to claim 8, wherein the media player module further comprises a rubber pad fixed to the attachment member,
    spring-shaped electrical device electrically connected to the bottom of the PCB and contracted inward under the action of external forces.

\* \* \* \* \*